US007966525B2

(12) United States Patent
Endl et al.

(10) Patent No.: US 7,966,525 B2
(45) Date of Patent: Jun. 21, 2011

(54) DIAGNOSTIC PROCEDURE AND DEVICE FOR A FIELD BUS SYSTEM

(75) Inventors: Hans Endl, Taubenstrasse (DE); Dirk Palme, Salzstrasse (DE)

(73) Assignee: Softing AG, Haar (DE)

( * ) Notice: Subject to any disclaimer, the term of this patent is extended or adjusted under 35 U.S.C. 154(b) by 472 days.

(21) Appl. No.: 11/976,974

(22) Filed: Oct. 30, 2007

(65) Prior Publication Data

US 2008/0140874 A1 Jun. 12, 2008

(30) Foreign Application Priority Data

Oct. 31, 2006 (DE) .......................... 10 2006 051 444

(51) Int. Cl.
*G06F 11/00* (2006.01)
(52) U.S. Cl. ............................................ 714/47; 714/43
(58) Field of Classification Search ................... 714/43, 714/47; 700/21, 79
See application file for complete search history.

(56) References Cited

U.S. PATENT DOCUMENTS

| 5,097,469 | A | | 3/1992 | Douglas | |
|---|---|---|---|---|---|
| 5,442,639 | A | * | 8/1995 | Crowder et al. | 714/712 |
| 5,796,721 | A | * | 8/1998 | Gretta, Jr. | 370/245 |
| 5,971,581 | A | * | 10/1999 | Gretta et al. | 700/83 |
| 6,076,952 | A | * | 6/2000 | Gretta et al. | 700/83 |
| 6,631,409 | B1 | * | 10/2003 | Watson et al. | 709/224 |
| 6,918,067 | B2 | * | 7/2005 | Bartucca et al. | 714/47 |
| 7,103,810 | B2 | * | 9/2006 | Childress et al. | 714/57 |
| 7,146,230 | B2 | * | 12/2006 | Glanzer et al. | 700/83 |
| 7,231,483 | B2 | * | 6/2007 | Gros et al. | 710/305 |
| 7,430,690 | B2 | * | 9/2008 | Meyer-Grafe et al. | 714/43 |
| 7,487,398 | B2 | * | 2/2009 | Abdo et al. | 714/37 |
| 7,590,701 | B2 | * | 9/2009 | Panec et al. | 709/207 |
| 2002/0161940 | A1 | | 10/2002 | Eryurek et al. | |
| 2003/0004987 | A1 | | 1/2003 | Glanzer et al. | |
| 2004/0117689 | A1 | * | 6/2004 | Harper et al. | 714/43 |
| 2004/0221205 | A1 | * | 11/2004 | Kozlov et al. | 714/47 |
| 2005/0027379 | A1 | * | 2/2005 | Dyk et al. | 700/79 |

(Continued)

FOREIGN PATENT DOCUMENTS

DE 101 38 066 A1 2/2003

(Continued)

OTHER PUBLICATIONS

Muskinja, Tovornik, Terbuc, "Use of TCP/IP Protocol in Industrial Environment," SI-2000, 2003, p. 896-900, Smetanova 17, University of Maribor, Maribor, Slovenia.

(Continued)

*Primary Examiner* — Joshua A Lohn
(74) *Attorney, Agent, or Firm* — Duane Morris, LLP (57) ABSTRACT

The invention relates to a computer-implemented diagnostic procedure for a field bus system in which bus users exchange data via a field bus in accordance with a predetermined communication protocol, the data being exchanged in the form of data packets, comprising the following procedural steps: (a) recording states of the bus users; (b) detecting a data packet which is transmitted via the field bus between the bus users; (c) analyzing the data packet and deriving an updated state of the bus users in dependence on the preceding state of the bus users and the content of the data packet; (d) recording the updated states of the bus users; (e) repeating steps (b) to (d) in order to detect the current states of the bus users in an in-line manner.

25 Claims, 4 Drawing Sheets

U.S. PATENT DOCUMENTS

| | | | | |
|---|---|---|---|---|
| 2005/0097404 | A1* | 5/2005 | Smith et al. | 714/47 |
| 2006/0075009 | A1* | 4/2006 | Lenz et al. | 708/160 |
| 2008/0104453 | A1* | 5/2008 | Mukherjee et al. | 714/47 |

FOREIGN PATENT DOCUMENTS

| | | |
|---|---|---|
| DE | 10 2004 032 687 B3 | 12/2005 |
| DE | 10 2004 055 698 A1 | 5/2006 |

OTHER PUBLICATIONS

Joo, Young-Jae and Lee, Tae-Eog, "Virtual Contol: A Virtual Cluster Tool for Testing and Verfying a Cuser Tool Controller and Scheduler," IEEE Robotics & Automation Magazine, Sep. 2004, p. 33-49.

* cited by examiner

DIAGNOSTIC PROCEDURE AND DEVICE FOR A FIELD BUS SYSTEM

FIELD OF THE INVENTION

The invention relates to a computer-implemented diagnostic procedure and a diagnostic facility for a field bus system in which one or more controllers and a number of field devices exchange data via a field bus in accordance with a predetermined communication protocol.

BACKGROUND OF THE INVENTION

Field bus systems are digital communication systems widely used in industry, which connect a multiplicity of field devices such as sensors, actuators and drives, input and output assemblies, controllers, operating devices and displays and other components of automation technology with one another. At present, different field bus systems having different characteristics are established on the market, e.g. PROFIBUS, INTERBUS, Control Net, FOUNDATION field bus, CAN or LON. In recent years, Ethernet-based communication systems with an extension for real time, which have the potential of replacing the previously known field bus systems in the future, have been increasingly becoming established in the industrial domain. In the context of the present invention, the term field bus thus designates such local networks which are suitable for industrial applications for connecting field devices and controllers.

Figure 1:
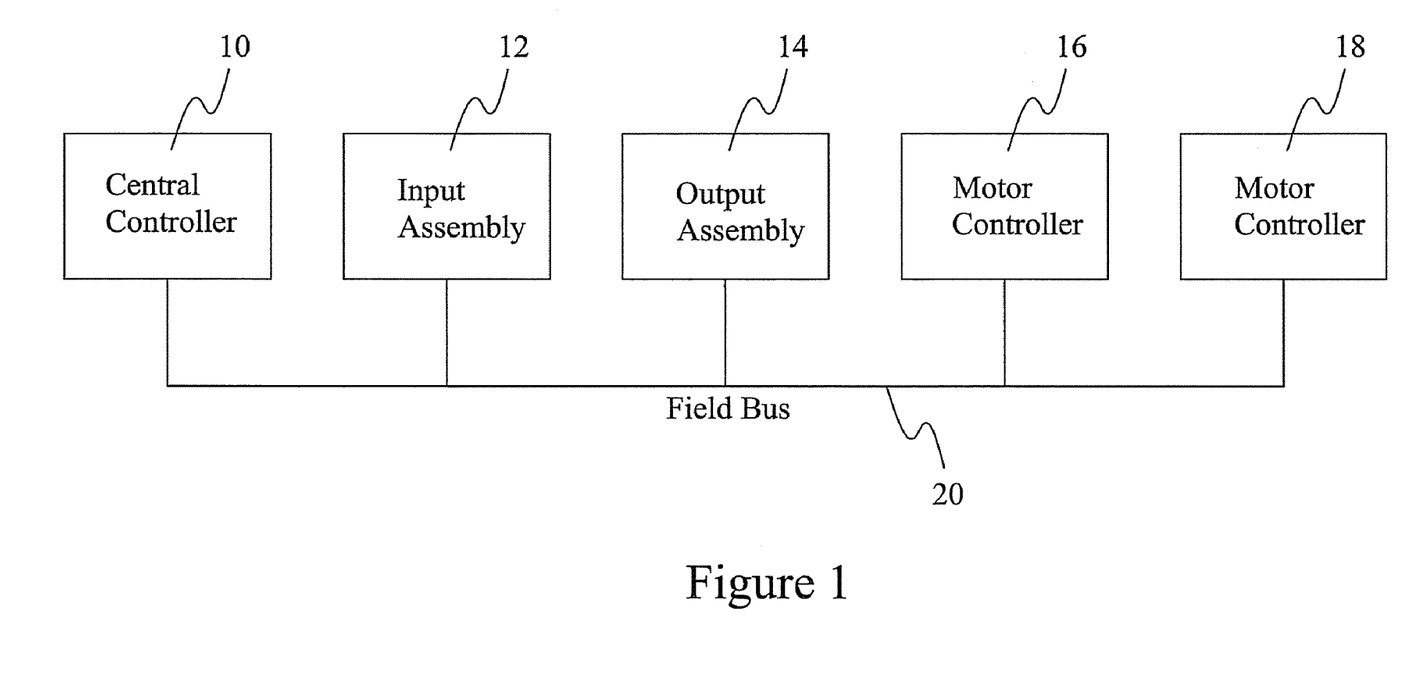
FIG. 1 shows a schematic illustration of a field bus system according to the prior art.

FIG. 1 schematically shows an example of such a field bus system in which a central controller 10 is connected to a multiplicity of field devices 12, 14, 16, 18 via a field bus line 20. The invention can also be applied to systems having a number of controllers.

A field bus system operates on the basis of a protocol stack which is built up of three to seven protocol layers building upon one another, including a physical layer, a data link layer and an application layer. The data transmission between the field devices occurs on the physical layer and the data link layer. The physical layer specifies how signals are sent, the field bus data link layer specifies how the network is jointly used and the individual devices obtain access to the network, and the application layer defines the application-specific services and data formats.

In field bus systems, digitally coded data are transmitted in discrete segments which are generally called data packets or messages. The number of users sharing a field bus medium is variable and, as a rule, is between 2 and 32 field devices, wherein logical link-ups of a number of field bus segments can also have three digit user numbers.

The data packets are transmitted on the field bus between the field devices and the controller. Each data packet can contain information with respect to the data link layer and information with respect to the application layer or with respect to other layers depending on the architecture of the system.

In a field bus system, errors can occur in different layers, starting with physical errors such as invalid signal levels, invalid signal forms and electromagnetic interference, via errors in the data link layer such as protocol violations up to errors in the application layer such as wrong configuration of the communication relations between the bus users. If the errors remain undetected, this can lead to the loss of critical information and to faulty operation of the field devices controlled by the field bus system. Errors can also impair the field bus system itself. To detect, analyze and eliminate such errors, the data traffic on the field bus is observed, therefore.

For functional checking and for fault finding in field bus systems, protocol analyzers such as message analyzers and bus monitors are used in the prior art. Such programs, which, as a rule, are PC-based, are connected to the field bus system to be examined via a bus interface such as an Ethernet port or a PROFIBUS interface. In the prior art, it is also known to connect to the field bus system independent testing devices in which the bus interface, a display and the test software are integrated in one device.

Protocol analyzers act passively, i.e. they observe the data traffic on the field bus but do not transmit themselves and record the data packets (messages) transmitted on the field bus. Although earlier versions of protocol analyzers were already capable of acquiring data in real time, the possibilities of analysis were limited. The data packets were acquired and stored initially and analyzed at a later time. Storage usually comprises the representation of the data packets in symbolic form in various protocol layers or levels of abstraction. Furthermore, the transmitting time of each data packet is logged by an associated time stamp. During the recording of the data packets, filter and trigger functions enable the volume of data to be reduced. Simple statistical evaluations, e.g. the indication of the addresses of the stations active on the bus (Live List) or the indication of error counters are also possible in the systems of the prior art.

From U.S. Pat. No. 5,442,639 and U.S. Pat. No. 5,796,721, protocol analyzers are also already known which are capable of analyzing the field bus traffic in real time. These systems, too, operate on the basis of filters, U.S. Pat. No. 5,796,721 describing a bus monitor which can allow the data packets from a field bus to pass through a number of filters. The filtered packets can be represented in real time. According to this document, the filter parameters can be varied in operation.

Figure 2:
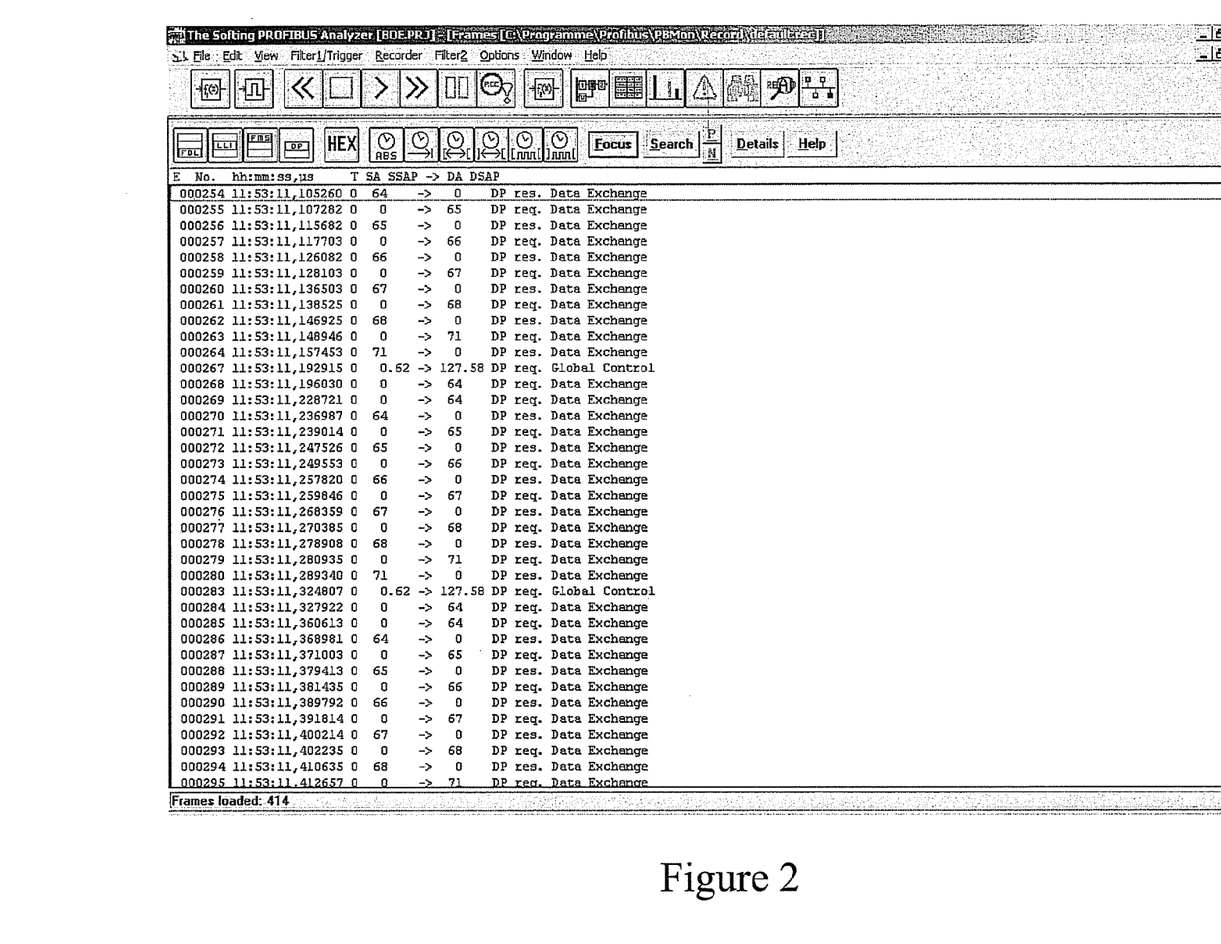
FIG. 2 shows a screen print-out for representing data packets which are evaluated in a traditional protocol analyzer.

FIG. 2 shows by way of example the representation of the message traffic in a protocol analyzer of the prior art without any filtering. From left to right, a message number, a time stamp, source and destination address and message type or communication service are displayed. Clicking twice on a message causes it to be displayed in detail and to be decoded. The volume of data can be reduced by applying filters, as mentioned above.

The protocol analyzers of the prior art have a number of disadvantages which are represented briefly in the text which follows:

In industrial applications, there is demand for shorter and shorter response times which leads to ever increased transmission rates and thus to ever larger volumes of data which are transmitted on the field bus. A recording accurate to the bit position thus leads to data volumes of many megabytes per second which can only be handled with difficulty. For example, a PROFIBUS system generates about 1 Mbyte of message data per second at a transmission rate of 12 Mbit/sec.

Due to the large volumes of data, the bus traffic can only be recorded section by section. As an alternative, it must be filtered in advance in accordance with particular criteria. As a result, data packets may, under certain circumstances, be missing which are only transmitted at particular intervals such as at the bus or device start-up or which are filtered out due to preset filter criteria. However, such data packets can contain essential information for the interpretation of the field bus traffic.

In the known system, the user must interpret the messages. For this purpose, he needs detailed knowledge about the communication protocol of the field bus system which, as a rule, is not available to the operator of a field bus system.

Data packets can frequently be interpreted correctly only in the context of the states of the transmitting and receiving bus user. However, this context is known neither to the protocol analyzer nor to the user. This problem can be illustrated by means of the example of a chess game performed via mail. The significance of the chess move described in an arbitrarily selected letter only becomes apparent to the person who knows the state of the game. Thus, the situation on the chessboard must be known for a reasonable interpretation. In the same manner, a reasonable interpretation of the communication protocol of the field bus system can only be carried out with knowledge of the states of the connected users. This knowledge is largely lacking in the known protocol analyzers.

As a rule, traditional bus monitors with message recording are used only when an error has occurred and is to be analyzed. It is frequently difficult then to reproduce the error. In addition, correction of the bus monitor requires an intervention in the system which is frequently rejected by the system operator.

It is, therefore, an object of the invention to specify a diagnostic procedure and a diagnostic facility for a field bus system which allows a continuous and on-line state analysis of the data traffic of the field bus system.

SUMMARY OF THE INVENTION

The basic concept of the invention is an analysis procedure in which, instead of recording the data traffic of the field bus system, possibly with filtering and subsequent off-line analysis of the stored data packets, a continuous and in-line state analysis of the data traffic in the field bus system is carried out. For this purpose, knowledge about the states of the field devices and protocol knowledge is utilized which exists in the protocol stacks used for the communication. In detail, the states of the field devices are recorded, data packets which are transmitted via the field bus between the controller and the field devices are detected and analyzed and an updated state of the field devices is derived in dependence on the preceding state of the field device and the content of the data packet. The updated states of the field devices are recorded, the detecting, analyzing and recording being repeated cyclically.

Thus, the invention does not record the data traffic in the field bus system with bit-position accuracy for a later analysis but analyses it in-line. This means that even during the reception of a data packet, its content is analyzed and evaluated with respect to its information content. From this, the information of interest to the user is derived which can relate to the state of a field device, the state of the field bus and/or the state of the entire field bus system.

The diagnostic procedure described can preferably be implemented as software implementation in PC-based protocol analysis modules and in devices for bus monitoring, which are permanently installed in a field bus system.

The procedure according to the invention makes use of the fact that communication protocols are frequently specified and implemented formally as state machines, so that the invention can also be implemented as a state machine. A state machine, also called finite state machine, is a model of the behavior consisting of states, state transitions and actions. A state stores the information about the past, i.e. it reflects the changes in the input since system start-up to the current time. A state transition indicates the change in the state of a state machine and is described by logical conditions. An action is the output of the state machine which occurs in a particular situation. Accordingly, a received data packet leads to a new internal state, and possibly to an action, e.g. the sending of a response or the activation of a device function, in dependence on the internal state of the receiver, e.g. the field device. In the procedure according to the invention, this principle is also applied for the diagnosis of the field bus system wherein, in distinction from a normal bus user, i.e. the controller and field devices, the diagnostic component preferably detects all data packets present on the bus and replicates the states of all bus users. The diagnostic procedure according to the invention is preferably implemented by software. In principle, this software thus behaves like the receiver of a data packet and can replicate its internal states and reactions (actions). However, the diagnostic software should do this separately for each user in the field bus system, particularly for each field device, and in each case needs an instantiation of the state data of the users of the field bus system for this purpose.

According to the invention, the information obtained from the analysis of the data packets is thus matched against the last known state of the transmitting and receiving device. From this, a new state pattern of the bus users affected is optionally derived. It is thus possible that the diagnostic procedure according to the invention always maintains a current pattern or image of the state of the bus users, i.e. of the field devices, of the field bus and of the controller. This "pattern" or "image" is implemented, for example, by a state vector which reproduces the field-bus-specific states or communication states of the bus users, i.e. particularly of the field devices and of the controller(s).

The detection and recording of the state information in the state vector forms the context, which is not transmitted on the field bus, which is essential for the interpretation of the data packets. Furthermore, the state vector represents the current state information of the field bus system and thus the information which is actually of interest to a user.

In the preferred embodiment of the invention, the state vector is generated cyclically and contains the state information of the field bus and of all bus users. In bus systems which operate cyclically such as the PROFIBUS-DP, a new state vector is generated per bus cycle. In other cases, the cycle of state observation, detection and analysis can be predetermined by a user.

The procedure of state detection and observation according to the invention enables the information due to the packet traffic to be condensed and reduced to the information content which is actually of interest to the user. As a result, the data traffic in the field bus system can be observed over long periods of time without a loss of data occurring.

The condensation of information is also a result of the fact that cyclic protocols have a high redundancy of information. A particular process value is possibly transmitted thousands of times without changing. Each communication protocol also contains a multitude of data packets which control the protocol but are not information-bearing in the sense of the application. Such data packets do not need to be recorded but can be statistically evaluated and provide valuable information in the case of a fault. According to the invention, it is provided, therefore, to analyze the data packets with respect to message repetitions, error messages and/or state changes of the bus users and to detect and statistically evaluate the frequency of these message repetitions, error messages or state changes. In particular, this allows a possible deterioration of the field bus system to be detected early.

In principle, the diagnostic procedure according to the invention operates passively; thus it does not actively participate in the data traffic on the field bus. In one embodiment of the invention, however, it can also be provided that information is actively queried by actively sending a data packet through the diagnostic system. This is appropriate if particular state information cannot be obtained by pure observation as in the case of data which are only transmitted during the start-up of the system, when this start-up could not be observed.

The diagnostic procedure and the diagnostic facility according to the invention, respectively, can be integrated as fixed components of a field bus system so that it is not necessary to connect them only in the case of a fault. In practice, connecting the diagnostic system in case of a fault only, would frequently provide problems because it could be rejected by the system operator because of a possible influence on the system.

The diagnostic procedure according to the invention can provide both a current pattern of the field bus system and detect and store a complete or partial history of the operation and can thus gain considerably more information than is possible with a short-term message recording. In this context, it can be provided according to the invention to record only the current states or both the current states and their history. Furthermore, the message recordings can be stored in addition to the state vectors if this appears to be necessary for a detailed analysis.

The invention allows error trends to be detected early due to long-term observations. Error detection occurs particularly by means of analysis of the data packets with respect to message repetitions, error messages and state changes of the bus users. This is based on the finding that even physical faults which are produced, for example, due to corrosion of contacts, due to the gradual deterioration of the quality of transmission initially only lead to individual faulty data packets which do not have a damaging effect due to protocol characteristics such as redundancy of information or message repetition but which can be detected statistically by means of suitable diagnostic measures. An example of this is the counting of message repetitions, wherein an accumulated occurrence of message repetitions within a particular time interval can indicate a deterioration in the transmission medium.

SHORT DESCRIPTION OF DRAWINGS

In the text which follows, the invention is explained in greater detail with reference to the drawings, by means of preferred embodiments. In the figures.

DETAILED DESCRIPTION

Figure 3:
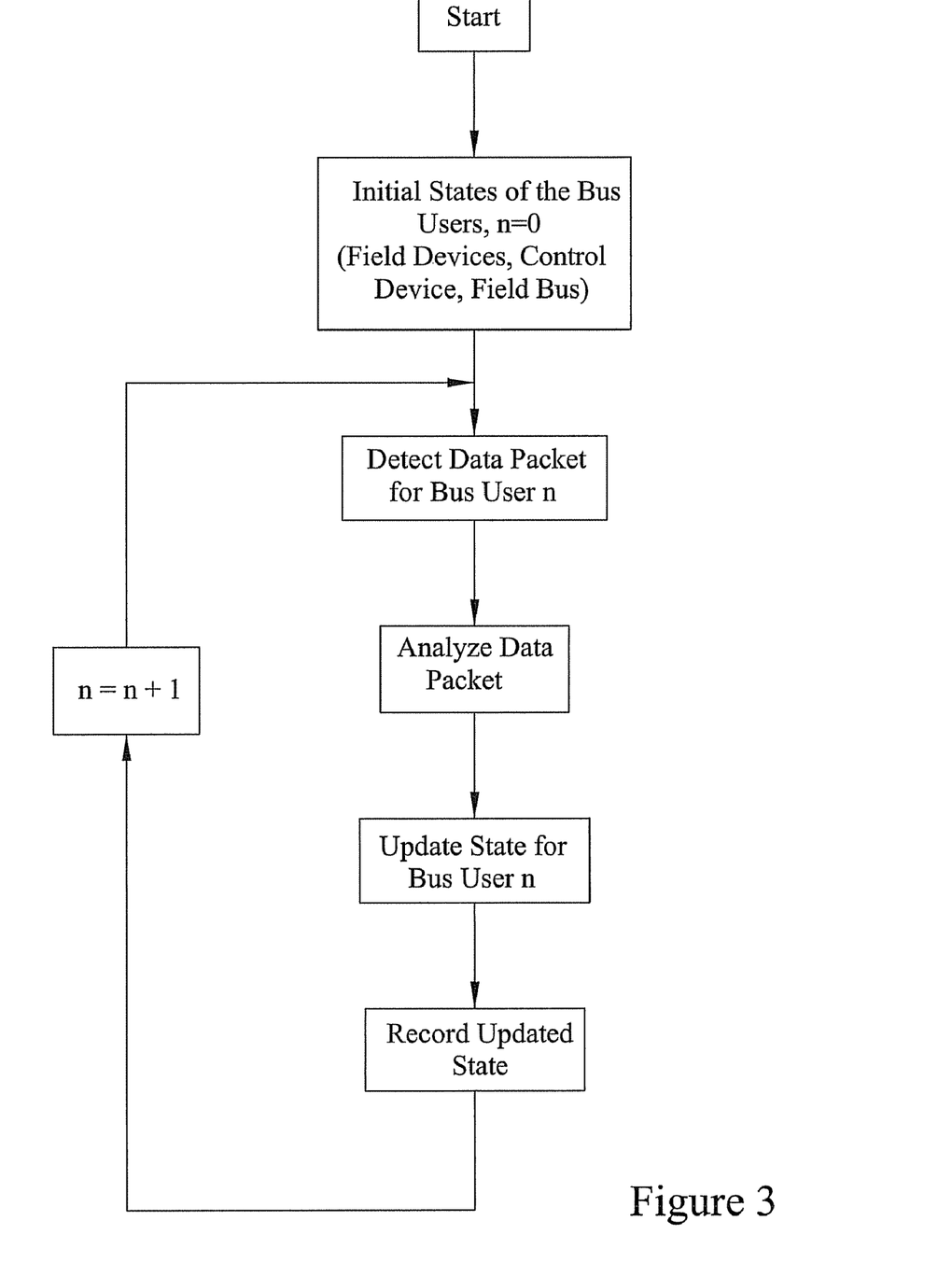
FIG. 3 shows a flow chart for representing the procedure according to the invention.

The basic structure of the diagnostic procedure according to the invention is shown in FIG. 3. In the procedure of the invention, initial states of the field bus system are initially recorded, wherein, in a potential initial state, the entire field bus system is shut down, the connected field devices are neither known nor configured and no connection is set up. However, the diagnostic procedure according to the invention can also be used during running operation of the field bus system, wherein it can then actively query missing information about the states of the bus users, if necessary. Examples of states of field devices and device-specific information which can be determined and updated by the diagnostic system according to the invention are:
 device address;
 device type;
 device starting up;
 device running in steady-state mode;
 device shutting down;
 device failing;
 device is wrongly parameterized or configured;
 device transmitting operating state;
 device transmitting alarm or error message;
 input/output data of the device.

Examples of state information which relates to the field bus and its connection to the bus users are:
 state of connection (set-up, cleared down);
 connection characteristics, e.g. cyclic, acyclic, logical channel number.

Examples of states which reproduce bus-specific information are:
 bus parameters such as transmission rate, line length, transmission methods, topology, priorities;
 timing parameters such as cycle times, pause times;
 error statistics such as message repetitions, faulty messages.

In the embodiment shown in FIG. 3, the diagnostic procedure according to the invention is used as a bus analyzer. It is implemented as a program which, for example, runs on a portable PC and can be connected to the field bus when necessary. For example, it is used by commissioning and service personnel for checking field bus systems and for fault finding in field bus systems. As mentioned above, the initial states of the bus users are initially determined in the procedure. Then the data packets are successively detected and analyzed for all bus users. Having knowledge of the preceding state for the respective bus user and of the associated data packet, the state can be updated for the respective bus user. The updated states are recorded. As a result, a simple classification of the states into categories such as "faultless operation", "irregularities in operation" and "error occurred" is initially possible. These states can be represented, for example, in color in the form of a traffic light function, allocating the colors green, yellow and red to the respective bus users. As a result, a user obtains a simple and illustrative overview of the operation of his field bus system without having to analyze any data packets. Using the procedure according to the invention, a nominal-actual comparison is also possible in which the expected ideal state of the field bus system is compared with the real system state and deviations are indicated. Typical state information for this application is:
 list of the field devices active on the field bus;
 operating states of the field devices such as start-up, shutdown, in operation, fault occurred, not configured or wrongly configured;
 input/output data of the field devices, edited device-specifically if possible;
 information relating to the field devices such as manufacturer, type;
 statistical information such as number of disturbed data packets, number of restarts, number of the alarm message.

Not all of this information can be decoded from the data packets (messages) alone. For example, the input/output data of the field devices are transmitted as an unformatted byte sequence, the semantics of the byte sequence being device specific. A semantically correct representation is possible only if a description of the device structure is available. Such descriptions are defined for virtually all field buses as "electronic device description".

For the evaluation of the input/output data of the field devices, the invention, in one embodiment, provides to issue for each device type an unambiguous type identification via which the associated electronic device description can be referenced. The diagnostic facility can then obtain from this file the necessary knowledge for semantically correct representation, e.g. of the input/output data or the alarm message.

This type of analysis of the data packets is illustrated in the example of a motor controller: particular bits of the input/output data signify, e.g. "on" or "off", "clockwise" or "anticlockwise"; other bits indicate that an alarm message is present. Within an alarm message, in turn, particular bits can signify "current limiting active" or "maximum operating temperature exceeded". The diagnostic facility can thus represent the state of a motor control device, instead of the binary representation "01100010", in plain text "motor on, counterclockwise".

Figure 4:
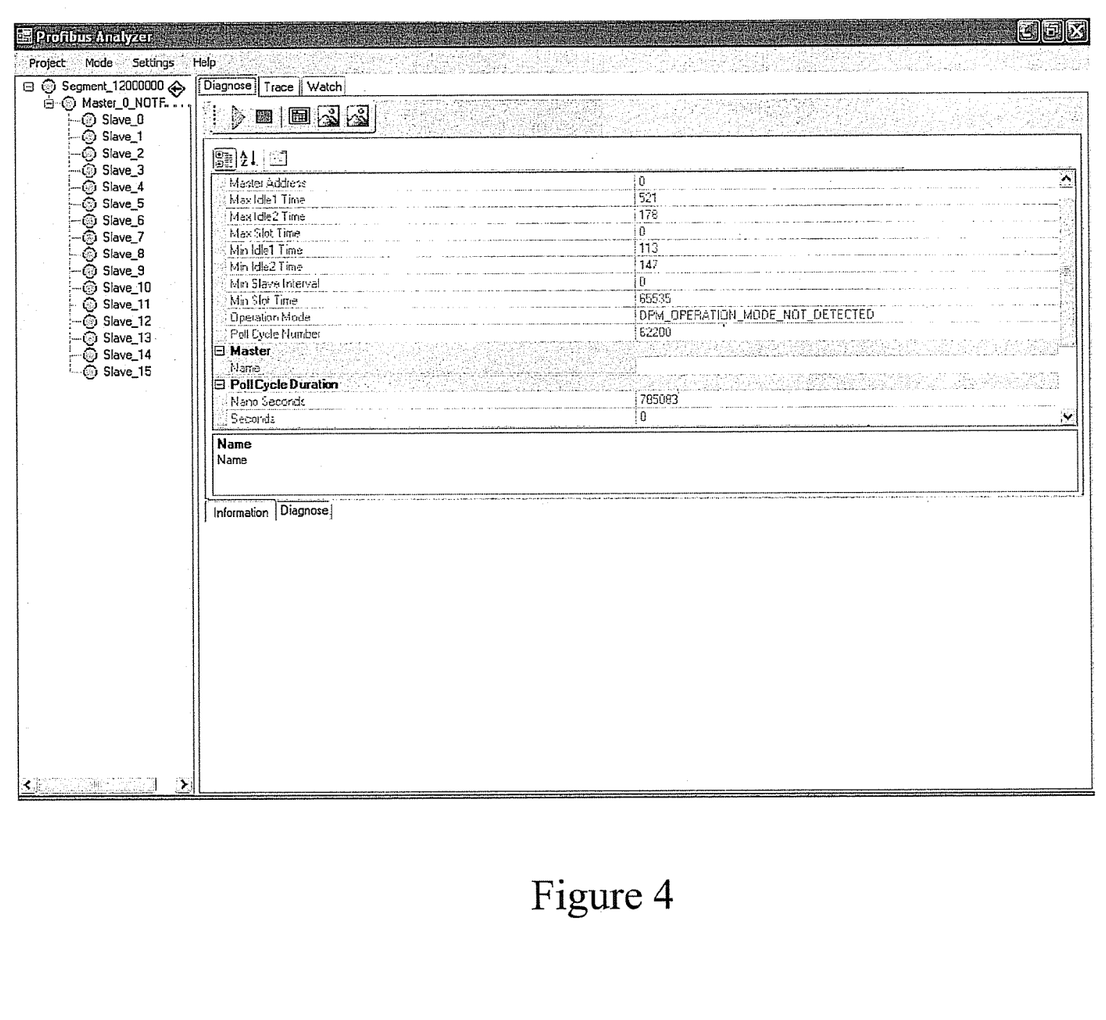
FIG. 4 shows a screen print-out for representing the state information in the diagnostic facility according to the invention.

FIG. 4 shows a screen print-out for representing the state information in the diagnostic facility according to the invention. The tree of the left-hand side of the figure shows a PROFIBUS segment, that is to say the field bus system, in which there is a master (controller) which, in turn, has a number of associated slaves (field devices). Each component, i.e. the actual field bus, the controller and the field devices, has an associated "traffic light", wherein the system state can be seen at a glance due to the representation with traffic light colors. On the right-hand side of the representation, the state data of in each case one component can be displayed in detail.

In a further embodiment of the invention, the diagnostic facility is mainly used for statistical long-term observation of the field bus system. For this purpose, the diagnostic procedure according to the invention is used in a diagnostic device permanently installed in the field bus system and the changes of particular elements of the state vector are predominantly considered which can point to malfunctions. These elements are, for example:

changes in the number of active field devices which can point to the failure of individual devices;

the occurrence, increase or decrease in message repetitions which can point to a deterioration or improvement in the line or signal quality;

a repeated occurrence of restart and/or reparameterization of the field devices which can point to a sporadic device failure;

the occurrence and particularly the accumulation of alarm messages.

In this embodiment of the diagnostic procedure according to the invention, the state vector which reproduces the states of the bus users is thus filtered for particular elements and statistically evaluated. By monitoring this state information, deterioration can be detected early and a system stoppage can be avoided by preventative maintenance. As a result, production failures, in particular, can be avoided.

In a further embodiment of the invention, the diagnostic facility is predominantly used for visualizing the process sequences and for evaluating the field bus system overall. As shown in FIG. 1, the field bus systems, as a rule, connect a central controller to field devices such as input/output assemblies, sensors, controllers and the like for process linkage. Communication occurs, for example, cyclically between the controller and the other bus users. Without a diagnostic device, the transmitted data could be accessed, for the purpose of visualization or logging, only via the controller to which, however, it is not possible to link arbitrary external systems. Therefore, the diagnostic procedure according to the invention can also be used for detecting data by passive monitoring in order to represent them visually or to log them.

The diagnostic procedure according to the invention can also be used for "asset management" or "asset monitoring" in order to detect, evaluate and store system data and operating parameters at a central point. In this context, complete inventories of the bus users and an evaluation of their operability can be generated. This can be implemented by the procedure according to the invention by merely "monitoring" the data traffic on the field bus without the existing communication structure having to be changed.

We claim:

1. Computer-implemented diagnostic procedure for a field bus system in which bus users exchange data via a field bus in accordance with a predetermined communication protocol, the data being exchanged in the form of data packets, comprising the following procedural steps:
   (a) recording operational states of the bus users;
   (b) detecting a data packet which is transmitted via the field bus between the bus users;
   (c) analyzing the data packet with respect to its information content;
   (d) predicting a current operational state of the bus users in dependence on the preceding state of the bus users and the information content of the data packet;
   (e) recording the current operational states of the bus users; and
   (f) repeating steps (b) to (e) in order to detect the current operational states of the bus users in an in-line manner.

2. Diagnostic procedure according to claim 1, wherein the states of the bus users are recorded in a state vector.

3. Diagnostic procedure according to claim 2, wherein the state vector is generated cyclically.

4. Diagnostic procedure according to claim 3, wherein the field bus system operates cyclically and a state vector is generated in each bus cycle.

5. Diagnostic procedure according to claim 3, wherein the cycle of generation of the state vector is predetermined by a user.

6. Diagnostic procedure according to claim 2, wherein in step (c), the current operational state of the field bus is also derived and in step (d), the current operational state of the field bus is recorded.

7. Diagnostic procedure according to claim 6, wherein the current operational state of the field bus is recorded in the state vector.

8. Diagnostic procedure according to claim 1, wherein in step (e), the current states of the bus users are continuously detected.

9. Diagnostic procedure according to claim 1, wherein the bus users comprise field devices and at least one controller and in step (e), the current states of all field devices are detected.

10. Diagnostic procedure according to claim 1, wherein a data packet is sent by a diagnostic device to at least one bus user and current operational state of the at least one bus user is derived in dependence on a response data packet sent by the bus user.

11. Diagnostic procedure according to claim 1, wherein the current operational states of the bus users are displayed.

12. Diagnostic procedure according to claim 1, wherein the data packets are analyzed with respect to input and/or output data of the bus users.

13. Diagnostic procedure according to claim 12, wherein the input and/or output data are displayed.

14. Diagnostic procedure according to claim 1, wherein the data packets are analyzed with respect to message repetitions, faulty data packets and/or state changes of the bus users.

15. Diagnostic procedure according to claim 14, wherein the frequency of the message repetitions, of the faulty data packets and/or the state changes is detected and statistically evaluated.

16. Diagnostic facility for a field bus system in which bus users exchange data via a field bus in accordance with a predetermined communication protocol, the data being exchanged in the form of data packets, comprising:
   means for recording operational states of the bus users;
   means for detecting data packets which are transmitted via the field bus between the bus users; and
   means for analyzing the data packets with respect to their information content and predicting the operational states of the bus users in dependence on the preceding states of the bus users and the information content of the data packets;
   wherein the means for recording states of the bus users are set up for recording operational states in an in-line manner.

17. Diagnostic facility according to claim 16, wherein the means for recording states of the bus users have a memory for storing state vectors.

18. Diagnostic facility according to claim 16, wherein the means for recording states of the bus users, the means for detecting data packets and the means for analyzing the data packets and deriving current operational states of the bus users are set up for operating cyclically.

19. Diagnostic facility according to claim 16, wherein the means for analyzing the data packets are set up for also deriving a current operational state of the field bus and the means for recording states of the bus users are set up for also recording the current operational state of the field bus.

20. Diagnostic facility according to claim 16, further comprising means for sending a data packet to at least one field device which is a bus user, wherein the means for analyzing the data packets are set up for deriving the current operational of the field device in dependence on a response data packet sent by the field device.

21. Diagnostic facility according to claim 16, further comprising a display for displaying the updated states of the bus users.

22. Diagnostic facility according to claim 16, wherein the means for analyzing the data packets are set up for analyzing the data packets with respect to input and/or output data of the bus users.

23. Diagnostic facility according to claim 16, wherein the means for analyzing the data packets are set up for analyzing the data packets with respect to message repetitions, faulty data packets and/or state changes of the bus users.

24. Diagnostic facility according to claim 23, further comprising means for detecting and statistically evaluating the frequency of the message repetitions, the faulty data packets and/or the state changes in order to detect a possible deterioration of the bus or of the bus users.

25. Diagnostic facility according to claim 16, wherein it is implemented in an independent device unit which can be temporarily connected to the field bus for the purpose of analyzing the field bus system.

* * * * *